(12) United States Patent
Chiu et al.

(10) Patent No.: US 9,344,758 B2
(45) Date of Patent: May 17, 2016

(54) VIDEO STREAM PROCESSING APPARATUS, METHOD FOR DISPLAYING MIRROR VIDEO, AND DISPLAY DEVICE

(71) Applicant: ALi Corporation, Hsinchu (TW)

(72) Inventors: Lee-Chang Chiu, Hsinchu (TW); Chao-Ching Huang, Hsinchu (TW)

(73) Assignee: ALi Corporation, Hsinchu (TW)

( * ) Notice: Subject to any disclaimer, the term of this patent is extended or adjusted under 35 U.S.C. 154(b) by 104 days.

(21) Appl. No.: 14/298,355

(22) Filed: Jun. 6, 2014

(65) Prior Publication Data

US 2015/0281769 A1 Oct. 1, 2015

(30) Foreign Application Priority Data

Mar. 25, 2014 (CN) .......................... 2014 1 0114723

(51) Int. Cl.
*H04N 21/4363* (2011.01)
*H04N 5/38* (2006.01)
*H04N 5/44* (2011.01)
*H04N 21/436* (2011.01)
*H04N 21/6405* (2011.01)
*H04N 21/41* (2011.01)
*H04N 21/43* (2011.01)
*H04N 5/445* (2011.01)
*H04N 21/431* (2011.01)
*H04N 21/462* (2011.01)
*H04N 21/485* (2011.01)

(52) U.S. Cl.
CPC ........... *H04N 21/43637* (2013.01); *H04N 5/38* (2013.01); *H04N 5/4403* (2013.01); *H04N 5/44591* (2013.01); *H04N 21/4122* (2013.01); *H04N 21/4316* (2013.01); *H04N 21/43615* (2013.01); *H04N 21/4622* (2013.01); *H04N 21/4858* (2013.01); *H04N 21/6405* (2013.01)

(58) Field of Classification Search
CPC ... H04N 5/38; H04N 5/4403; H04N 5/44591; H04N 21/6405; H04N 21/43615; H04N 21/43637; H04N 7/15; H04N 21/42207; H04L 65/1069; H04L 65/4015; H04L 65/608; H04L 67/1074; H04L 67/104; H04W 76/023
See application file for complete search history.

(56) References Cited

U.S. PATENT DOCUMENTS

| | | | |
|---|---|---|---|
| 2009/0150553 A1* | 6/2009 | Collart | G06F 17/30017 709/229 |
| 2009/0315972 A1* | 12/2009 | Rensin | H04L 29/06027 348/14.02 |
| 2012/0042102 A1* | 2/2012 | Chung | H04M 1/7253 710/33 |
| 2013/0238702 A1* | 9/2013 | Sheth | H04L 67/38 709/204 |
| 2014/0104214 A1* | 4/2014 | Sheeley | G06F 3/041 345/173 |
| 2014/0347433 A1* | 11/2014 | Kafle | H04L 65/1069 348/14.02 |

* cited by examiner

*Primary Examiner* — Jefferey Harold
*Assistant Examiner* — Sean Haiem
(74) *Attorney, Agent, or Firm* — J.C. Patents

(57) ABSTRACT

A video stream processing apparatus, a method for display mirror video and a display device are provided. The video stream processing apparatus includes a connection establishing module, a mirror video receiving module, and a mirror video display module. The connection establishing module is configured to establish a first wireless connection with a first source device, and establish a second wireless connection with a second source device. The mirror video receiving module is configured to receive a first mirror video from the first source device through the first wireless connection, and receive a second mirror video from the second source device through the second wireless connection. The mirror video display module is configured to control a screen to separately display the first mirror video or the second mirror video, or simultaneously display the first mirror video and the second mirror video.

18 Claims, 8 Drawing Sheets

VIDEO STREAM PROCESSING APPARATUS, METHOD FOR DISPLAYING MIRROR VIDEO, AND DISPLAY DEVICE

CROSS-REFERENCE TO RELATED APPLICATION

This application claims the priority benefit of China application serial no. 201410114723.4, filed on Mar. 25, 2014. The entirety of the above-mentioned patent application is hereby incorporated by reference herein and made a part of this specification.

BACKGROUND

1. Technical Field

The invention relates to a video stream processing apparatus, and particularly relates to a video stream processing apparatus, a method for displaying mirror video and a display device, which are capable of simultaneously or separately providing mirror videos of different sources.

2. Related Art

Along with quick development of wireless communication technology, video transmission originally implemented between electronic apparatuses by using physical lines has been developed to today's technique of implementing the video transmission between electronic apparatuses through a wireless approach.

However, although most of videos can be transmitted through the wireless approach, regarding mirror of the video, it is still limited to one-to-one video mirroring, and simultaneous selection or switching of a plurality of video sources through wireless transmission cannot be effectively implemented, so that an effect of mirroring a video displayed on a specific apparatus to a local apparatus according to current demand cannot be effectively implemented.

SUMMARY

The invention is directed to a video stream processing apparatus, a method for displaying mirror video and a display device, which are capable simultaneously or separately providing mirror videos of different sources.

The invention provides a video stream processing apparatus including a processor and a non-transitory storage medium. The non-transitory storage medium is coupled to the processor, and is configured to store a plurality of program modules, wherein the plurality of program modules is executed by the processor. The plurality of program modules including a connection establishing module, a mirror video receiving module and a mirror video display module. The connection establishing module is configured to establish a first wireless connection with a first source device, and establish a second wireless connection with a second source device. The mirror video receiving module is configured to receive a first mirror video from the first source device through the first wireless connection, and receive a second mirror video from the second source device through the second wireless connection. The mirror video display module is configured to control a screen to separately display the first mirror video or the second mirror video or simultaneously display the first mirror video and the second mirror video.

In an exemplary embodiment of the invention, the first wireless connection and the second wireless connection coexist, and the first wireless connection and the second wireless connection are respectively complied with a wireless fidelity (WiFi) direct standard.

In an exemplary embodiment of the invention, the plurality of program modules further includes a control message transmitting module. The control message transmitting module is configured to transmit a pause message to the first source device for controlling the first source device to stop transmitting the first mirror video to the video stream processing apparatus, and is configured to transmit a play message to the second source device for controlling the second source device to transmit the second mirror video to the video stream processing apparatus.

In an exemplary embodiment of the invention, when the first mirror video is stopped transmitting to the video stream processing apparatus, the first wireless connection between the video stream processing apparatus and the first source device is continuously maintained.

In an exemplary embodiment of the invention, the pause message includes a real time streaming protocol pause message, and the play message includes a real time streaming protocol play message.

In an exemplary embodiment of the invention, the plurality of program modules further includes an operation gesture recognition module. The operation gesture recognition module is configured to receive an operation gesture, and determine whether the operation gesture relates to slide operation of a first direction or slide operation of a second direction, where the first direction is different to the second direction. The mirror video display module is further configured to switch the screen to display the first mirror video or the second mirror video according to whether the operation gesture is determined to be the slide operation of the first direction or the slide operation of the second direction.

In an exemplary embodiment of the invention, the first source device belongs to a first multicast group, the second source device belongs to a second multicast group, the first mirror video includes a first group mirror video belonging to the first multicast group, and the second mirror video includes a second group mirror video belonging to the second multicast group. The plurality of program modules further includes a group establishing module. The group establishing module is configured to receive a first group establishing message from the first source device, and transmits a first registration confirmation message in response to the first group establishing message, so as to register the video stream processing apparatus to the first multicast group. The group establishing module is further configured to receive a second group establishing message from the second source device, and transmits a second registration confirmation message in response to the second group establishing message, so as to register the video stream processing apparatus to the second multicast group. The connection establishing module is configured to establish the first wireless connection with the first source device after the video stream processing apparatus is registered to the first multicast group, and establish the second wireless connection with the second source device after the video stream processing apparatus is registered to the second multicast group.

In an exemplary embodiment of the invention, the plurality of program modules further includes a mirror video transmitting module and a search module. The search module is configured to search for at least one network device in a network domain. The group establishing module is further configured to transmit at least one third group establishing message after the search module finds the at least one network device. The group establishing module is further configured to receive at least one third registration confirmation message, and register at least one of the found network device to a third multicast group in response to the received third registration confirmation message. After the group establishing module registers the at least one of the found network device to the third multicast group, the mirror video transmitting module is configured to transmit a third group mirror video belonging to the third multicast group to the registered network device through a third wireless connection.

According to another aspect, the invention provides a method for displaying mirror video, which is adapted to a video stream processing apparatus. The method includes following steps. A first wireless connection is established with a first source device, and a second wireless connection is established with a second source device. A first mirror video is received from the first source device through the first wireless connection, and a second mirror video is received from the second source device through the second wireless connection. A screen is controlled to separately display the first mirror video or the second mirror video or simultaneously display the first mirror video and the second mirror video.

In an exemplary embodiment of the invention, the step of receiving the first mirror video from the first source device through the first wireless connection and receiving the second mirror video from the second source device through the second wireless connection includes following steps. A pause message is transmitted to the first source device for controlling the first source device to stop transmitting the first mirror video to the video stream processing apparatus. A play message is transmitted to the second source device for controlling the second source device to start transmitting the second mirror video to the video stream processing apparatus.

In an exemplary embodiment of the invention, after the first source device stops transmitting the first mirror video to the video stream processing apparatus, the method further includes continuously maintaining the first wireless connection between the video stream processing apparatus and the first source device.

In an exemplary embodiment of the invention, the method for displaying mirror video further includes following steps. An operation gesture is received, and it is determined whether the operation gesture is related to slide operation of a first direction or slide operation of a second direction, where the first direction is different to the second direction. The screen is switched to display the first mirror video or the second mirror video according to whether the operation gesture is determined to be the slide operation of the first direction or the slide operation of the second direction.

In an exemplary embodiment of the invention, the first source device belongs to a first multicast group, the second source device belongs to a second multicast group, the first mirror video includes a first group mirror video belonging to the first multicast group, and the second mirror video includes a second group mirror video belonging to the second multicast group. The method further includes following steps. A first group establishing message comes from the first source device is received, and a first registration confirmation message is transmitted in response to the first group establishing message, so as to register the video stream processing apparatus to the first multicast group. A second group establishing message comes from the second source device is received, and second registration confirmation message is transmitted in response to the second group establishing message, so as to register the video stream processing apparatus to the second multicast group. The step of establishing the first wireless connection with the first source device and establishing the second wireless connection with the second source device includes following steps. The first wireless connection is established with the first source device after the video stream processing apparatus is registered to the first multicast group, and the second wireless connection is established with the second source device after the video stream processing apparatus is registered to the second multicast group.

In an exemplary embodiment of the invention, the method for displaying mirror video further includes following steps. At least one network device in a network domain is searched. At least one third group establishing message is transmitted after the at least one network device is found. At least one third registration confirmation message is received, and at least one of the found network device is registered to a third multicast group in response to the received third registration confirmation message. After the at least one of the found network device being registered to the third multicast group, at least one third group mirror video belonging to the third multicast group is transmitted to the registered network device through at least one third wireless connection.

The invention provides a display device including a screen and a video stream processing apparatus. The video stream processing apparatus is electrically connected to the screen, and includes a connection establishing module, a mirror video receiving module, a mirror video display module and an operation gesture recognition module. The connection establishing module is configured to establish a first wireless connection with a first source device, and establish a second wireless connection with a second source device, where the first wireless connection and the second wireless connection coexists, and the first wireless connection and the second wireless connection are respectively complied with a wireless fidelity direct standard. The mirror video receiving module is configured to receive a first mirror video from the first source device through the first wireless connection, and receive a second mirror video from the second source device through the second wireless connection. The mirror video display module is configured to control the screen to separately display the first mirror video or the second mirror video, or simultaneously display the first mirror video and the second mirror video. The operation gesture recognition module is configured to receive an operation gesture, and determine whether the operation gesture relates to slide operation of a first direction or slide operation of a second direction, where the first direction is different to the second direction. The mirror video display module is configured to switch the screen to display the first mirror video or the second mirror video according to whether the operation gesture is determined to be the slide operation of the first direction or the slide operation of the second direction.

According to the above descriptions, the video stream processing apparatus, the method for displaying mirror video and the display device of the invention can establish wireless connections with two or more than two source devices, and receive mirror videos through the established wireless connections. Then, by controlling the screen to separately or simultaneously display the received mirror videos of different sources, an effect of selectively presenting the mirror videos of different sources is achieved.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
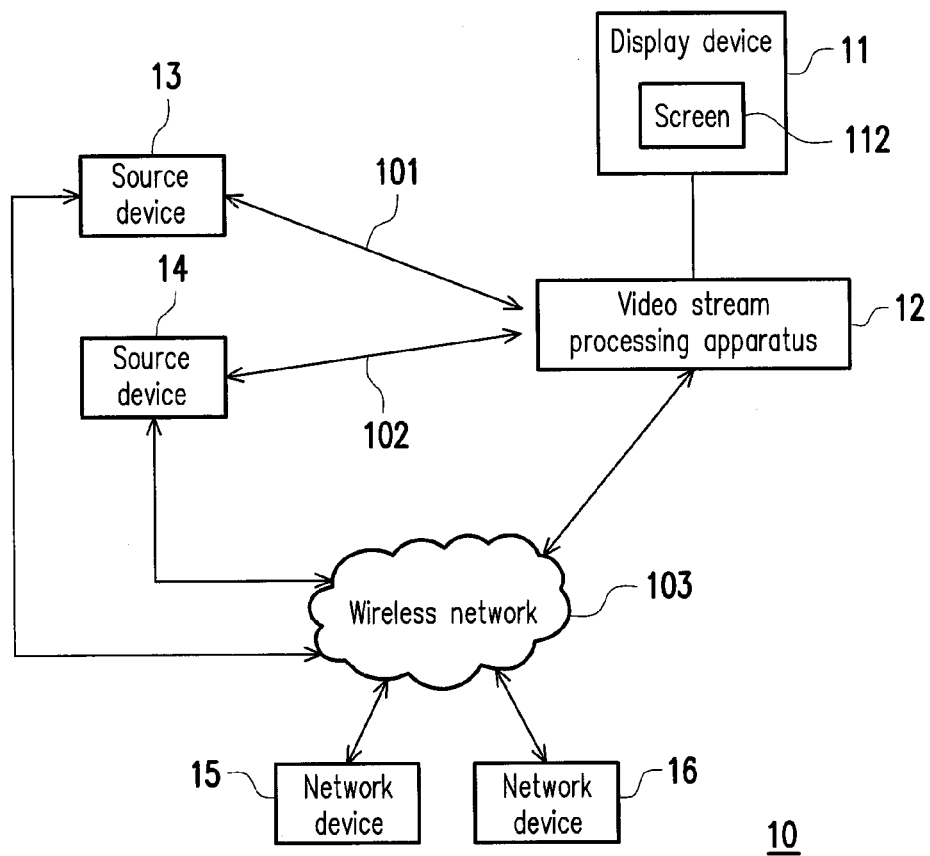
FIG. 1 is a schematic diagram of a mirror video display system according to an exemplary embodiment of the invention.

FIG. 1 is a schematic diagram of a mirror video display system according to an exemplary embodiment of the invention.

Referring to FIG. 1, in the present exemplary embodiment, the mirror video display system 10 includes a display device 11, a video stream processing apparatus 12, a source device 13, and a source device 14.

The display device 11 can be a conventional television (TV), a smart TV, an Internet TV, or various displays, though the invention is not limited thereto. The display device 11 has a screen 112, and the screen 112 can be driven to display videos. The screen 112 can be a touch screen or a non-touch screen, which is not limited by the invention.

The video stream processing apparatus 12 is electrically connected to the display device 11. The video stream processing apparatus 12 may receive a wired or wireless video stream, and play a corresponding video through the display device 11. For example, the video stream processing apparatus 12 can be an electronic device having video stream processing capability, such as a set-top box (STB) or a DVD player, etc. Although the video stream processing apparatus 12 in FIG. 1 is illustrated outside the display device 11, in an exemplary embodiment, the video stream processing apparatus 12 can be disposed in the display device 11 to serve as a processor of the display device 11. For example, the video stream processing apparatus 12 can be combined with the display device 11 to form a desktop computer, a notebook, a smart phone, a game machine, or a personal digital assistant (PDA), etc., which is not limited by the invention.

The source device 13 and the source device 14 can be electronic apparatus having video stream processing and playing capabilities, such as smart TVs, Internet TVs, desktop computers, notebooks, smart phones, game machines, or PDAs, etc., though the invention is not limited thereto. The number of the source device 13 and the source device 14 can be two, three, or more. The source device 13 and the source device 14 are taken as an example for descriptions, and application of more source devices can be deduced by analogy.

The video stream processing apparatus 12 can be connected to the source device 13 and the source device 14 through peer to peer (P2P) wireless connections 101 and 102 and/or through a wireless network 103. For example, the wireless network 103 can be the Internet or a local area network. For simplicity, the wireless connection between the video stream processing apparatus 12 and the source device 13 is hereafter referred as a first wireless connection, and the wireless connection between the video stream processing apparatus 12 and the source device 14 is hereafter referred as a second wireless connection. Moreover, the video stream processing apparatus 12 can also be connected to the source device 13 and the source device 14 through physical lines, which is not limited by the invention.

Figure 2:
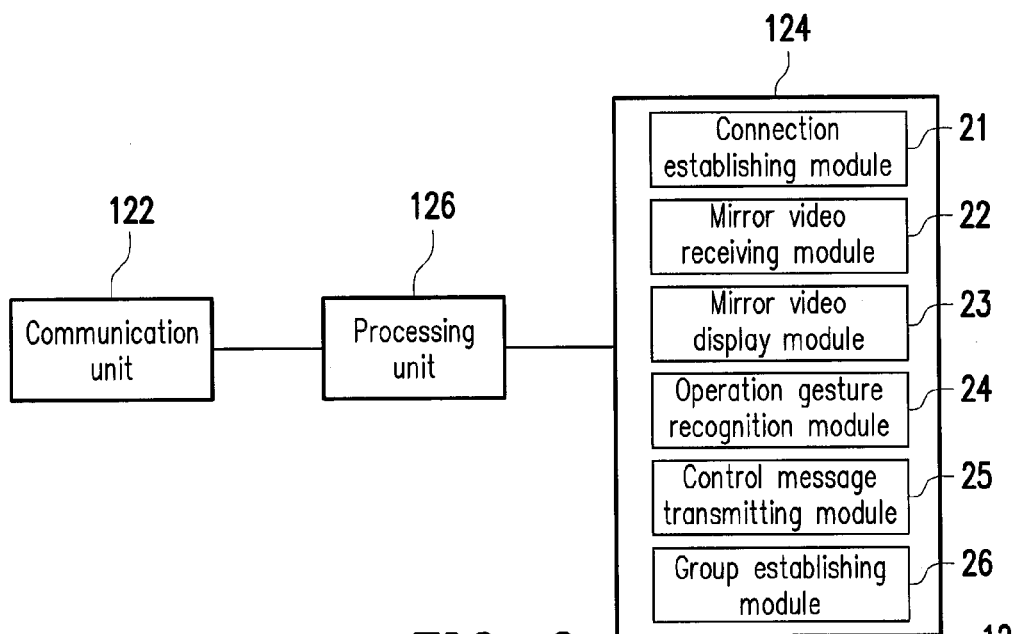
FIG. 2 is a schematic diagram of a video stream processing apparatus according to an exemplary embodiment of the invention.

FIG. 2 is a schematic diagram of a video stream processing apparatus according to an exemplary embodiment of the invention.

Referring to FIG. 2, the video stream processing apparatus 12 includes a communication unit 122, a storage unit 124, and a processing unit 126.

The communication unit 122 is used for providing wireless connection. For example, the communication unit 122 may include a wireless network interface card.

The storage unit 124 is used for storing data. For example, the storage unit 124 may include non-transitory storage medium, such as at least one of a hard disk, a memory, and an external storage medium (for example, a flash drive), or a combination thereof, which is not limited by the invention. In an exemplary embodiment, the storage unit 124 may also include transitory storage medium, such as RAM, which is not limited by the invention.

The processing unit 126 is used for data processing. For example, the processing unit 126 may perform processing functions such as compressing/decompressing, coding/decoding, filtering, de-noising, and/or signal amplifying, etc. on a video stream, though the invention is not limited thereto. For example, the processing unit 126 can be a processor and/or a microprocessor, though the invention is not limited thereto. Moreover, in an exemplary embodiment, the processing unit 126 may also be used to process an audio signal.

In the present exemplary embodiment, the storage unit 124 stores a plurality of program modules (for example, a set of program codes), and the processing unit 126 can execute the program modules. For example, in the present exemplary embodiment, the program modules at least include a connection establishing module 21, a mirror video receiving module 22, and a mirror video display module 23. By executing the connection establishing module 21, the processing unit 126 can control the communication unit 122 to establish the first wireless connection with the source device 13, and establish the second wireless connection with the source device 14. By executing the mirror video receiving module 22, the processing unit 126 can control the communication unit 122 to receive a first mirror video from the source device 13 through the first wireless connection, and receive a second mirror video from the source device 14 through the second wireless connection. By executing the mirror video display module 23, the processing unit 126 can control the screen 112 to separately display the first mirror video or the second mirror video, or simultaneously display the first mirror video and the second mirror video. The aforementioned mirror video refers to video signals corresponding to a video currently displayed or played by a source device. For example, the first mirror video refers to video signals corresponding to a video currently displayed by the source device 13, and the second mirror video refers to video signals corresponding to a video currently displayed by the source device 14.

Figure 3:
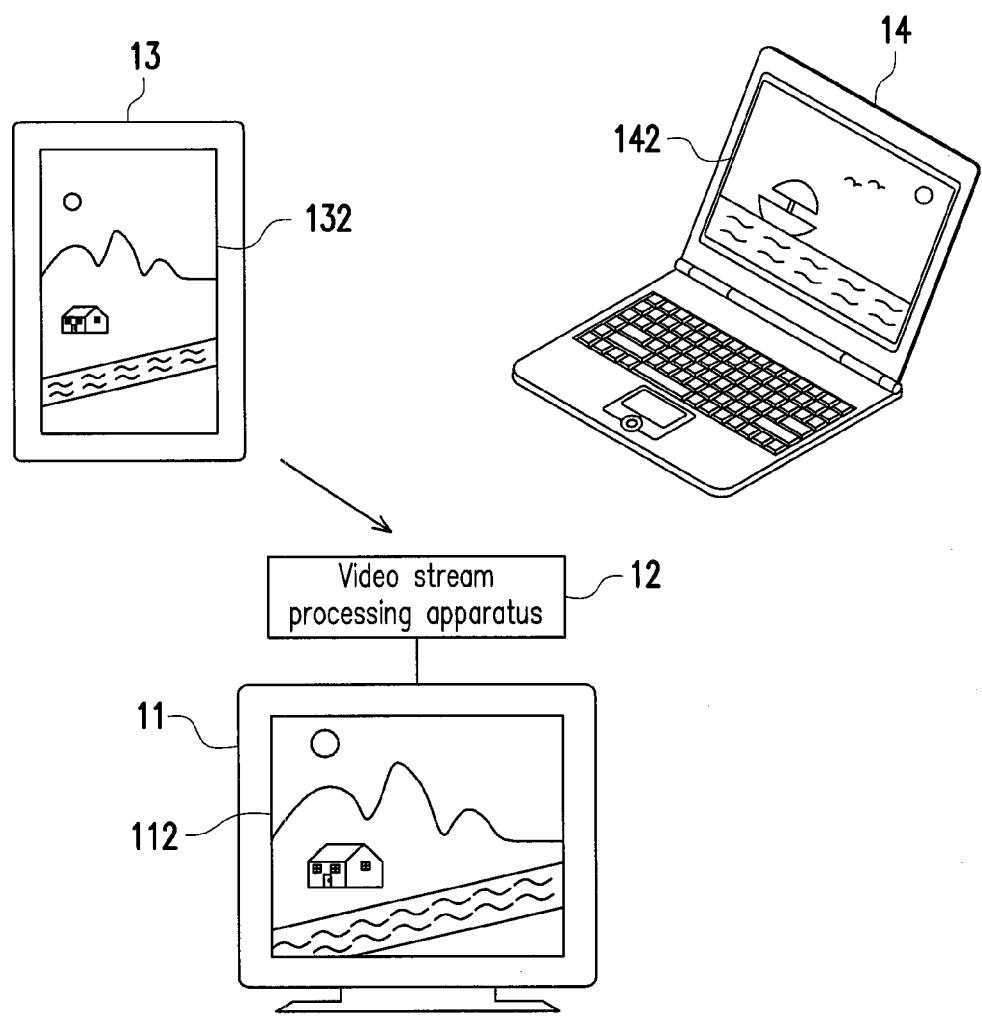
FIG. 3 is an exemplary schematic diagram of separately displaying a first mirror video according to an exemplary embodiment of the invention.
Figure 4:
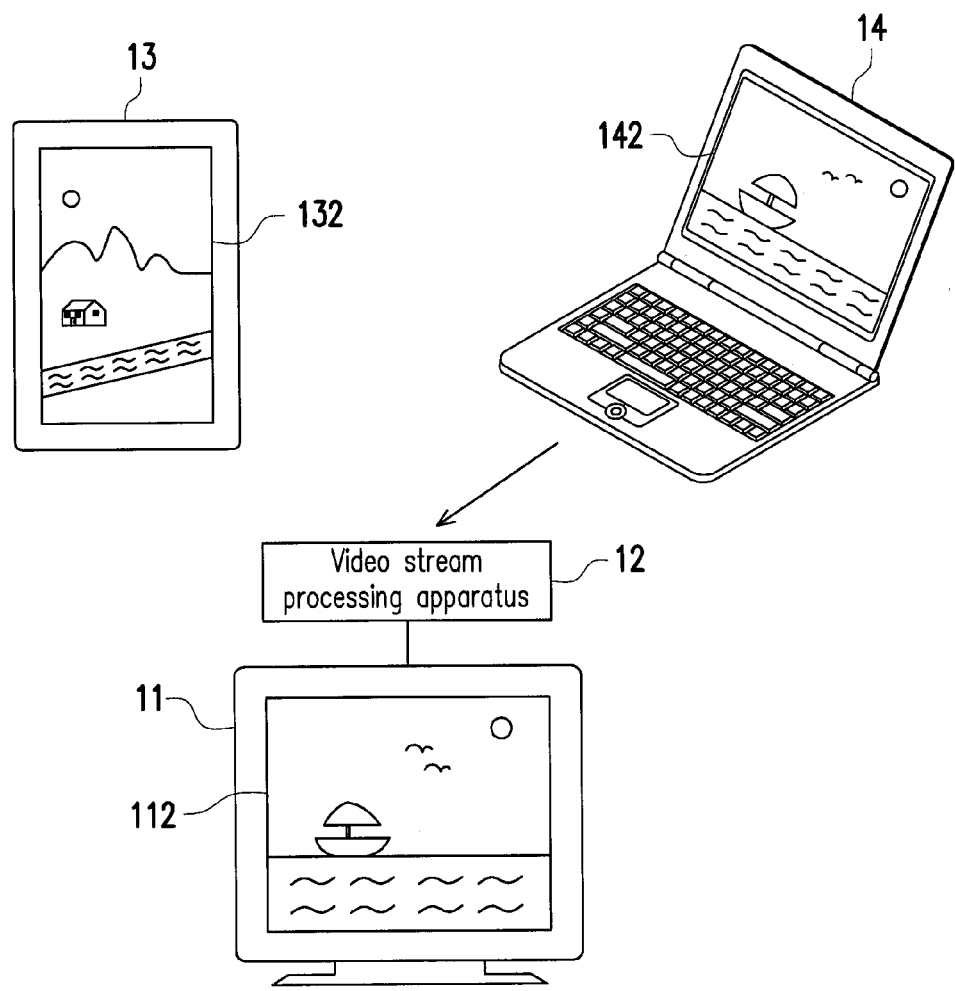
FIG. 4 is an exemplary schematic diagram of separately displaying a second mirror video according to an exemplary embodiment of the invention.
Figure 5:
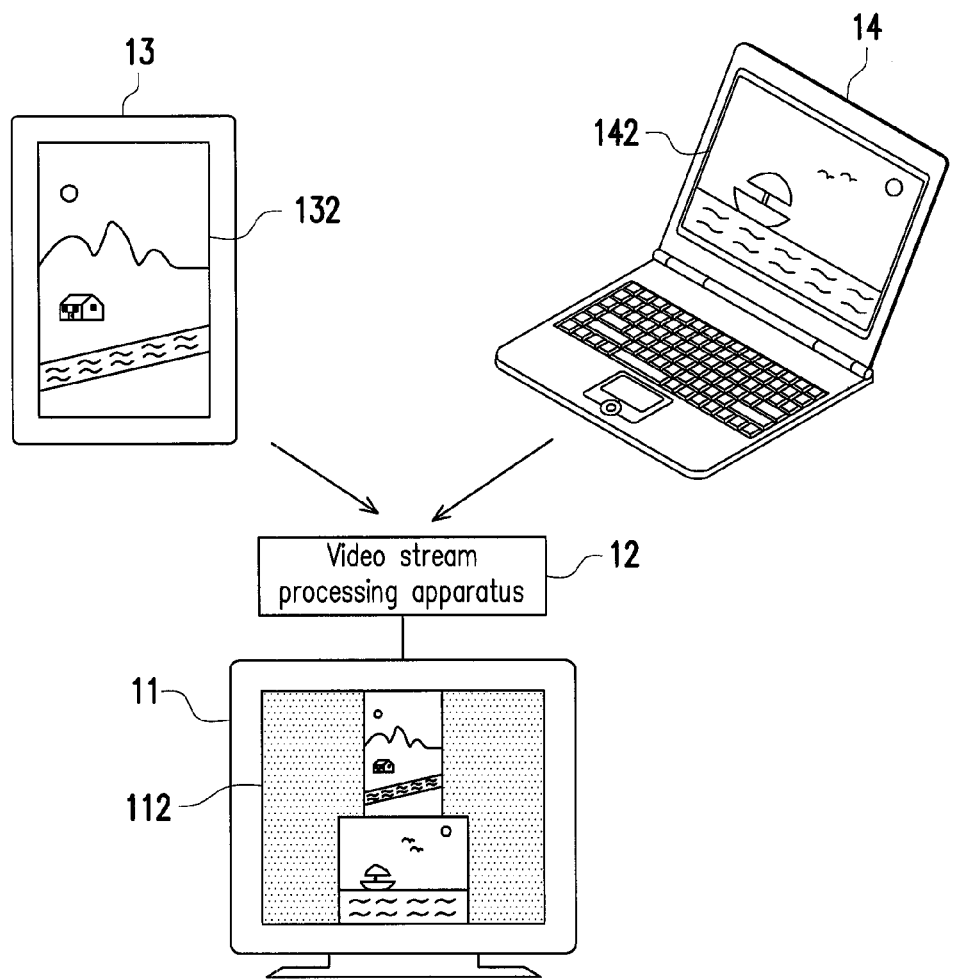
FIG. 5 is an exemplary schematic diagram of simultaneously displaying a first mirror video and a second mirror video according to an exemplary embodiment of the invention.

FIG. 3 is an exemplary schematic diagram of displaying the first mirror video according to an exemplary embodiment of the invention. FIG. 4 is an exemplary schematic diagram of displaying the second mirror video according to an exemplary embodiment of the invention. FIG. 5 is an exemplary schematic diagram of simultaneously displaying the first mirror video and the second mirror video according to an exemplary embodiment of the invention.

Referring to FIG. 3, it is assumed that the source device 13 has a screen 132, and the source device 14 has a screen 142. A video image corresponding to the first mirror video is displayed on the screen 132, and a video image corresponding to the second mirror video is displayed on the screen 142. When the processing unit 126 controls the screen 112 to separately display the first mirror video comes from the source device 13, the video image corresponding to the first mirror video is synchronously or almost synchronously displayed on the screen 132 and the screen 112. Moreover, the video image corresponding to the first mirror video can be displayed on the screen 112 in a full screen mode or a window mode.

Referring to FIG,. 4, when the processing unit 126 controls the screen 112 to separately display the second mirror video comes from the source device 14, the video image corresponding to the second mirror video is synchronously or almost synchronously displayed on the screen 142 and the screen 112. Moreover, the video image corresponding to the second mirror video can be displayed on the screen 112 in the full screen mode or the window mode.

Referring to FIG. 5, when the processing unit 126 controls the screen 112 to simultaneously display the first mirror video comes from the source device 13 and the second mirror video comes from the source device 14, the video image corresponding to the first mirror video is synchronously or almost synchronously displayed on the screen 132 and the screen 112, while the video image corresponding to the second mirror video is synchronously or almost synchronously displayed on the screen 142 and the screen 112. The video image corresponding to the first mirror video and the video image corresponding to the second mirror video can be individually displayed in windows. For example, the video image corresponding to the first mirror video and the video image corresponding to the second mirror video can be displayed on the screen 112 side by side in the full screen mode (shown in FIG. 5). Alternatively, the video image corresponding to the first mirror video and the video image corresponding to the second mirror video can be displayed on the screen 112 in complete or partial overlap, which is not limited by the invention.

In an exemplary embodiment, when the first mirror video and the second mirror video are simultaneously displayed, the first mirror video and the second mirror video can be displayed on the screen 112 in an original mode or an extension mode. In the original mode, the arrangement and/or individual aspect ratios of the video image corresponding to the first mirror video and the video image corresponding to the second mirror video that are displayed on the screen 112 are correspondingly adjusted to be complied with aspect ratios of the first mirror video and the second mirror video displayed on the screen 132 and the screen 142, respectively (shown in FIG. 5). In the extension mode, the video image corresponding to the first mirror video and the video image corresponding to the second mirror video are extended to fill a full display region of the screen 112 (for example, the displayed video images are vertically and/or horizontally broadened) without producing a black area shown in FIG. 5. Namely, if the first mirror video and the second mirror video are displayed in the original mode, the video images corresponding to the first mirror video and the second mirror video have no distortion, and if the first mirror video and the second mirror video are displayed in the extension mode, in order to fill the whole screen 112, the video images corresponding to the first mirror video and the second mirror video may be distorted. Moreover, in an exemplary embodiment, according to the number of the mirror videos simultaneously displayed on the screen 112, the aspect ratio and/or arrangement of the video image corresponding to each mirror video that is displayed on the screen 112 are adaptively adjusted.

In another exemplary embodiment, the program modules stored in the storage unit 124 may further include an operation gesture recognition module 24, as exemplarily shown in FIG. 2. By executing the operation gesture recognition module 24, the processing unit 126 can receive and determine an operation gesture of the user. For example, the operation gesture can be a touch operation gesture such as clicking or sliding on the screen 112 by the user. The processing unit 126 determines whether the operation gesture relates to slide operation of a first direction or slide operation of a second direction different to the first direction, and controls the screen 112 to display the first mirror video or the second mirror video according to whether the operation gesture is determined to be slide operation of the first direction or the second direction. For example, it is assumed that the first direction is rightward, and the second direction is leftward, when the operation gesture is a rightward slide operation, the processing unit 126 controls the screen 112 to display the first mirror video (shown in FIG. 3), and when the operation gesture is a leftward slide operation, the processing unit 126 controls the screen 112 to display the second mirror video (shown in FIG. 4). However, actual directions of the first direction and the second direction are not limited by the invention. For example, in an exemplary embodiment, the first direction and the second direction can also be an upward direction and a downward direction, or a clockwise direction and an anticlockwise direction, etc., which are not limited by the invention. Moreover, in another exemplary embodiment, the slide operation of the first direction may be, for example, switching a mirror video displayed on the screen 112 in full screen or a foreground window to a next mirror video, and the slide operation of the second direction may be, for example, switching the mirror video displayed on the screen 11:2 in full screen or the foreground window to a previous mirror video. For example, it is assumed that the mirror video displayed on the screen 112 in full screen or the foreground window is the first mirror video, when the received operation gesture is the rightward slide operation, the processing unit 126 controls the screen 112 to display a next mirror video (for example, the second mirror video) in full screen or the foreground window. Moreover, when the received operation gesture is the leftward slide operation, the processing unit 126 controls the screen 112 to display a previous mirror video (for example, the first mirror video) in full screen or the foreground window. In this way, the user can conveniently switch the mirror videos displayed in full screen or the foreground window by using operation gestures. The above operation is also adapted to mirror videos provided from more than two source devices, which is not limited by the invention.

In an exemplary embodiment, according to whether the operation gesture relates to the slide operation of the first direction or the second direction, the processing unit 126 can control a display scale of each of the video image corresponding to the first mirror video and the video image corresponding to the second mirror video that are displayed on the screen 112. The display scale range can be from 0% to 100%. For example, when the display scale of the video image is 0%, the window used for presenting the video image is reduced to disappear on the screen 112. When the display scale of the video image is 100%, the window used for presenting the video image is enlarged to the full screen or to the maximum size of the video image. For example, in the exemplary embodiment of FIG. 5, when the operation gesture is a downward slide operation, the processing unit 126 enlarges the display scale of the video image corresponding to the first mirror video come from the source device 13, and reduces the display scale of the video image corresponding to the second mirror video come from the source device 14. On the other hand, when the operation gesture is an upward slide operation, the processing unit 126 reduces the display scale of the video image corresponding to the first mirror video come from the source device 13, and enlarges the display scale of the video image corresponding to the second mirror video come from the source device 14.

In an exemplary embodiment, when the video image corresponding to the first mirror video and the video image corresponding to the second mirror video are displayed on the screen 112 in complete overlap or partial overlap, the processing unit 126 can also control relative positions of the video image corresponding to the first mirror video and the video image corresponding to the second mirror video displayed on the screen 112 according to the operation gesture. For example, it is assumed that the video image corresponding to the first mirror video partially covers on the top of the video image corresponding to the second mirror video, when the slide operation of the first direction is received, the processing unit 126 switches the relative position of the video image corresponding to the first mirror video and the video image corresponding to the second mirror video displayed on the screen 112 to a position that the video image corresponding to the second mirror video partially covers on the top of the video image corresponding to the first mirror video, etc. Moreover, the operation gestures corresponding to the aforementioned various situations can also be replaced or assisted by various operation gestures such as a pinch inward slide gesture where two fingers pinch inward, a separate apart slide gesture where two fingers separate apart from each other, or a continuous click gesture, etc., which is not limited by the invention.

In an exemplary embodiment, the operation gestures can also be captured by the processing unit 126 through lenses of a camera disposed on the display device 11 or the video stream processing apparatus 12. Alternatively, the processing unit 126 can also select, switch or display the first mirror video and the second mirror video according to control signals transmitted by control devices such as a mouse, a keyboard, a remote controller, or a smart phone, etc., which is not limited by the invention.

In another exemplary embodiment, the processing unit 126 controls the communication unit 122 to establish peer to peer (P2P) wireless connections 101 and 102. For example, the wireless connection 101 and the wireless connection 102 are respectively complied with a wireless fidelity direct (Wi-Fi Direct) standard, and the wireless connection 101 and the wireless connection 102 can coexist. The mirror system formed based on the wireless connection 101 or the wireless connection 102 is also referred as a Miracast mirror system.

In the present exemplary embodiment, the program modules stored in the storage unit 124 further include a control message transmitting module 25 as shown in FIG. 2. By executing the control message transmitting module 25, the processing unit 126 can control the communication unit 122 to transmit a pause message or a play message to the source device 13 or the source device 14, so as to control the source device 13 or the source device 14 to stop or start transmitting the mirror video. For example, when the processing unit 126 wants to stop receiving the first mirror video, the processing unit 126 can control the communication unit 122 to transmit the pause message to the source device 13. For example, the pause message includes real time streaming protocol PAUSE (RTSP PAUSE) message. When the source device 13 receives the pause message, the source device 13 stops transmitting the first mirror video to the video stream processing apparatus 12. Particularly, after the source device 13 receives the pause message and stops transmitting the first mirror video to the video stream processing apparatus 12, the wireless connection 101 between the source device 13 and the video stream processing apparatus 12 may be continuously maintained without being turned off. On the other hand, the processing unit 126 can control the communication unit 122 to transmit the play message to the source device 14. For example, the pause message includes real time streaming protocol PLAY (RTSP PLAY) message. When the source device 14 receives the play message, the source device 14 starts to transmit the second mirror video to the video stream processing apparatus 12.

Similarly, after the source device 13 is controlled to stop transmitting the first mirror video to the video stream processing apparatus 12, the processing unit 126 can control the communication unit 122 to transmit the play message to the source device 13, so that the source device 13 may start transmitting the first mirror video again. After the source device 14 is controlled to start transmitting the second mirror video to the video stream processing apparatus 12, the processing unit 126 can control the communication unit 122 to transmit the pause message to the source device 14, so as to control the source device 14 to stop transmitting the second mirror video.

Namely, by transmitting the pause message or the play message, the processing unit 126 can selectively receive the first mirror video from the source device 13 or the second mirror video from the source device 14 while the wireless connection 101 and the wireless connection 102 are both continuously maintained. Moreover, since the wireless connection 101 and the wireless connection 102 are not required to be disconnected, the processing unit 126 can quickly switch to play the first mirror video comes from the source device 13 or the second mirror video comes from the source device 14 without re-establishing the wireless connection each time when the source of the mirror video is switched.

In another exemplary embodiment, the video stream processing apparatus 12 can also be connected to the source device 13 and the source device 14 through the wireless network 103, as shown in FIG. 1. The wireless network 103 is, for example, provided by a wireless access point. For example, the wireless access point can serve as a local wireless access point (wireless AP). In the present exemplary embodiment, a multicast group is taken as a unit for the mirror video multicast. One multicast group is composed of a master device and one or a plurality of slave devices. The slave devices belonging to the same multicast group may receive a group mirror video from the same master device. For example, it is assumed that the source device 13 belongs to a first multicast group and the source device 14 belongs to a second multicast group, the first mirror video comes from the source device 13 includes a first group mirror video belonging to the first multicast group, and the second mirror video comes from the source device 14 includes a second group mirror video belonging to the second multicast group.

In the present exemplary embodiment, the program modules stored in the storage unit 124 further include a group establishing module 26, as shown in FIG. 2. By executing the group establishing module 26, the processing unit 126 can control the communication unit 122 to receive a first group establishing message from the first source device 13, and transmit a first registration confirmation message to the source device 13 in response to the first group establishing message, so as to register the video stream processing apparatus 12 to the first multicast group where the source device 13 belongs to. By executing the group establishing module 26, the processing unit 126 can also control the communication unit 122 to receive a second group establishing message from the second source device 14, and transmits a second registration confirmation message to the source device 14 in response to the second group establishing message, so as to register the video stream processing apparatus 12 to the second multicast group where the source device 14 belongs to. After registering the video stream processing apparatus 12 to the first multicast group where the source device 13 belongs to, the processing unit 126 can control the communication unit 122 to establish the first wireless connection with the source device 13 through the wireless network 103, and after registering the video stream processing apparatus 12 to the second multicast group where the source device 14 belongs to, the processing unit 126 can control the communication unit 122 to establish the second wireless connection with the source device 14 through the wireless network 103.

After the first wireless connection is established, the processing unit 126 can control the communication unit 122 to receive the first mirror video from the source device 13 through the first wireless connection, and after the second wireless connection is established, the processing unit 126 can control the communication unit 122 to receive the second mirror video from the source device 14 through the second wireless connection. After the first mirror video and/or the second mirror video are/is received, the processing unit 126 can control the screen 112 to separately display the first mirror video or the second mirror video, or simultaneously display the first mirror video and the second mirror video. Display and switch of the first mirror video and the second mirror video are similar as that described in the aforementioned embodiments, and details thereof are not repeated.

Referring to FIG. 1 again, in another exemplary embodiment, the mirror video display system 10 may further include a network device 15 and a network device 16. The network device 15 and the network device 16 can be electronic devices having video stream processing capability, such as smart TVs, network TVs, desktop computers, notebooks, smart phones, game machines or PDAs, etc., and the invention is not limited thereto. The number of the network devices 15 and the network devices 16 can be two, three, more, or less.

In the present exemplary embodiment, the video stream processing apparatus 12 can serve as a source device (i.e. a master device) in a multicast group (which is referred to as a third multicast group hereinafter), so as to transmit a third group mirror video to one or a plurality of network devices (i.e. slave devices) belonging to the third multicast group.

In the present exemplary embodiment, the program modules stored in the storage unit 124 may further include a search module and a mirror video transmitting module (not shown). By executing the search module, the processing unit 126 can control the communication unit 122 to search for network devices in a network domain, and after one or more network devices in the network domain are found, by executing the group establishing module 26, the processing unit 126 can control the communication unit 122 to transmit one or a plurality of third group establishing messages to the network devices found. Then, after receiving one or a plurality of third registration confirmation messages from the network devices receiving the third group establishing messages, the processing unit 126 can register the corresponding network devices to the third multicast group, and by executing the mirror video transmitting module, the processing unit 126 can transmit the third group mirror video to each of the network devices registered to the third multicast group.

In detail, the aforementioned network domain refers to a physical network address or a virtual network address range covered by the wireless network 103. For example, when the network device 15 and the network device 16 are both connected to the wireless network 103, and the network device 15 and the network device 16 are individually assigned at least one actual or virtual network address covered by the wireless network 103, the network device 15 and the network device 16 are in the same network domain with the video stream processing apparatus 12. When the processing unit 126 searches and finds the network device 15 and the network device 16, the processing unit 126 can control the communication unit 122 to transmit third group establishing message to the network device 15 and the network device 16, individually. After receiving the third group establishing messages respectively, if users of the network device 15 and the network device 16 both agree to join the third multicast group, the network device 15 and the network device 16 may individually respond the third registration confirmation message to the video stream processing apparatus 12. When the processing unit 126 receives the third registration confirmation messages, the processing unit 126 can transmit the third group mirror video to the network device 15 and the network device 16 through wireless connections (which are referred as third wireless connections).

The methods exemplarily illustrated in FIG. 6 to FIG. 9 may be implemented to system and apparatus as shown in FIGS. 1 and 2; therefore please jointly refer to FIGS. 1 and 2 for the following embodiments.

Figure 6:
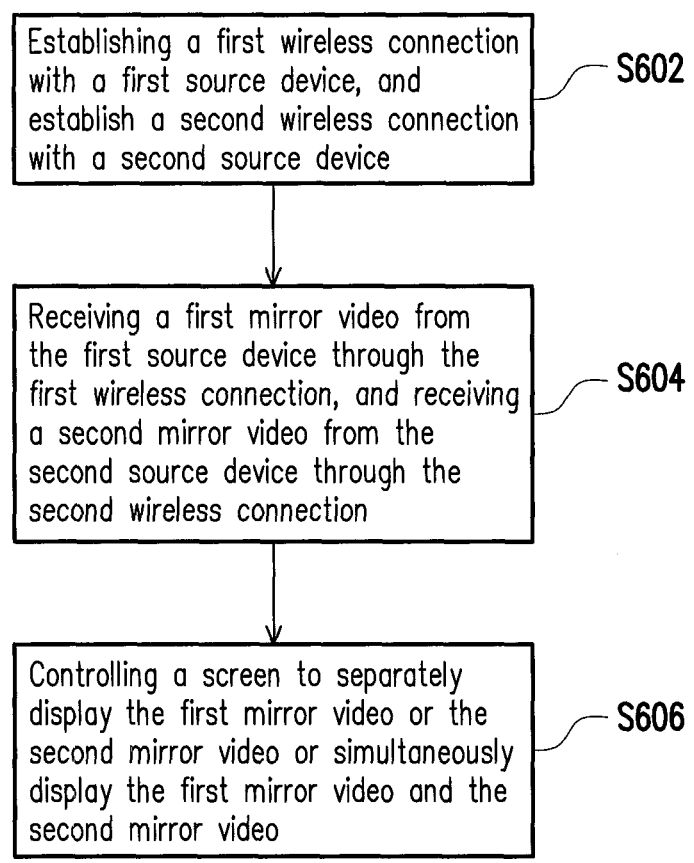
FIG. 6 is a flowchart illustrating a method for displaying mirror video according to an exemplary embodiment of the invention.

FIG. 6 is a flowchart illustrating a method for displaying mirror video according to an exemplary embodiment of the invention.

Referring to FIG. 6, in step S602, the processing unit 126 controls the communication unit 122 to establish a first wireless connection with the source device 13, and establish a second wireless connection with the source device 14. In step S604, the processing unit 126 controls the communication unit 122 to receive a first mirror video from the source device 13 through the first wireless connection, and receive a second mirror video from the source device 14 through the second wireless connection. In step S606, the processing unit 126 controls the screen 112 to separately display the first mirror video or the second mirror video or simultaneously display the first mirror video and the second mirror video.

Figure 7:
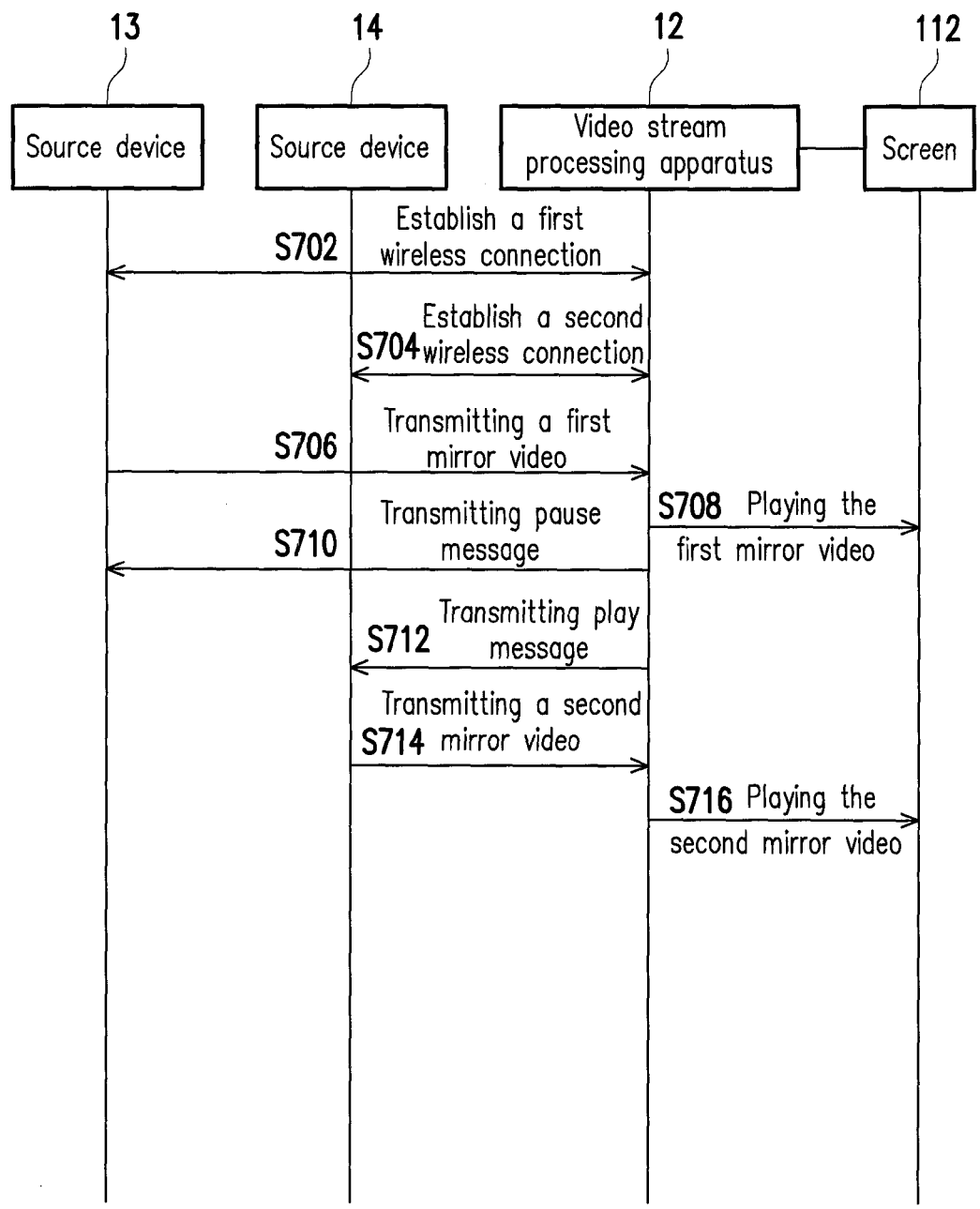
FIG. 7 is a communication timing diagram of a method for displaying mirror video according to an exemplary embodiment of the invention.

FIG. 7 is a communication timing diagram of the method for displaying mirror video according to an exemplary embodiment of the invention.

Referring to FIG. 7, in step 5702, the processing unit 126 controls the communication unit 122 to establish the first wireless connection between the video stream processing apparatus 12 and the source device 13. In step S704, the processing unit 126 controls the communication unit 122 to establish the second wireless connection between the video stream processing apparatus 12 and the source device 14. Here, the first wireless connection refers to the P2P wireless connection 101, and the second wireless connection refers to the P2P wireless connection 102, as shown in FIG. 1. Moreover, step S702 and step S704 can be simultaneously executed, or step S704 is firstly executed, and then step S702 is executed, which is not limited by the invention.

In step S706, the source device 13 transmits the first mirror video to the video stream processing apparatus 12 through the first wireless connection. After receiving the first mirror video, in step S708, the processing unit 126 controls the screen 112 to play the first mirror video. In step S710, the processing unit 126 controls the communication unit 122 to transmit the pause message to the source device 13. In response to the pause message, the source device 13 stops transmitting the first mirror video. In step S712, the processing unit 126 controls the communication unit 122 to transmit the play message to the source device 14. In response to the play message, in step S714, the source device 14 transmits the second mirror video to the video stream processing apparatus 12 through the second wireless connection. After receiving the second mirror video, in step S716, the processing unit 126 controls the screen 112 to display the second mirror video. Moreover, step S706 can be executed at any time after step S702 is executed (for example, step S706 is automatically executed after the first wireless connection is established), or step S706 is executed in response to another play message comes from the video stream processing apparatus 12, which is not limited by the invention.

Figure 8:
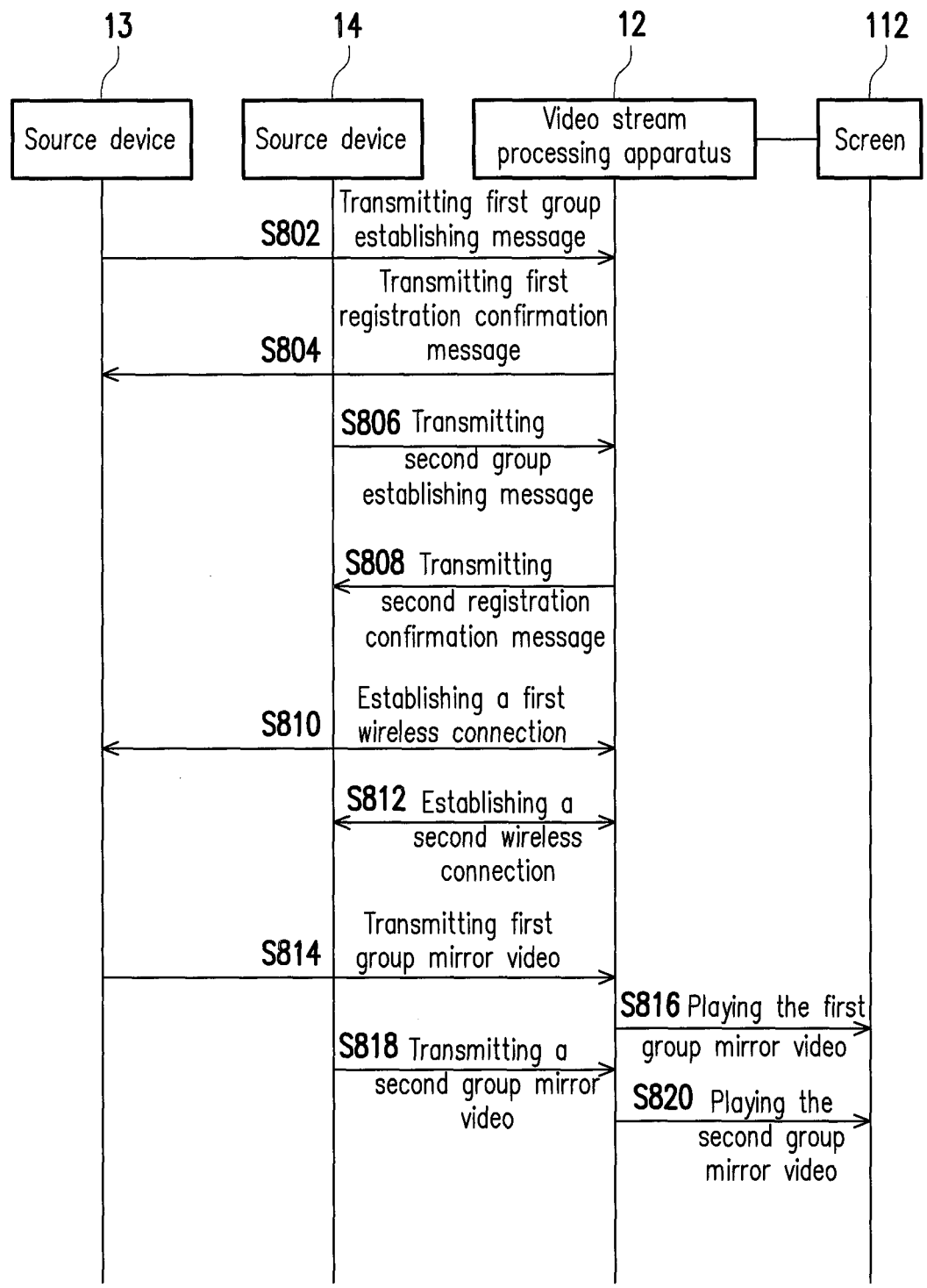
FIG. 8 is a communication timing diagram of a method for displaying mirror video according to an exemplary embodiment of the invention.

FIG. 8 is a communication timing diagram of the method for displaying mirror video according to an exemplary embodiment of the invention.

Referring to FIG. 8, in step S802, the source device 13 transmits a first group establishing message to the video stream processing apparatus 12. In response to the first group establishing message, if the user of the video stream processing apparatus 12 agrees to register the video stream processing apparatus 12 to the first multicast group where the source device 13 belongs to, in step S804, the processing unit 126 controls the communication unit 122 to transmit a first registration confirmation message to the source device 13. In response to the first registration confirmation message, the source device 13 registers the video stream processing apparatus 12 to the first multicast group. In step S806, the source device 14 transmits a second group establishing message to the video stream processing apparatus 12. In response to the second group establishing message, if the user of the video stream processing apparatus 12 agrees to register the video stream processing apparatus 12 to the second multicast group where the source device 14 belongs to, in step S808, the processing unit 126 controls the communication unit 122 to transmit a second registration confirmation message to the source device 14. In response to the second registration confirmation message, the source device 14 registers the video stream processing apparatus 12 to the second multicast group.

In step S810, the processing unit 126 controls the communication unit 122 to establish the first wireless connection between the video stream processing apparatus 12 and the source device 13 through the wireless network 103. In step S812, the processing unit 126 controls the communication unit 122 to establish the second wireless connection between the video stream processing apparatus 12 and the source device 14 through the wireless network 103. Step S810 and step S812 can be simultaneously executed, or step S812 may be followed by step S810, which is not limited by the invention.

In step S814, the source device 13 transmits the first group mirror video to all of the devices (including the video stream processing apparatus 12) belonging to the first multicast group through multicast. After receiving the first group mirror video, in step S816, the processing unit 126 controls the screen 112 to display the first group mirror video. Similarly, in step S818, the source device 14 transmits the second group mirror video to all of the devices (including the video stream processing apparatus 12) belonging to the second multicast group through multicast. After receiving the second group mirror video, in step S820, the processing unit 126 controls the screen 112 to display the second group mirror video. It should be noticed that the first group mirror video and the second group mirror video can be independently played (for example, step S814 and step S816 may be omitted, or step S818 and step S820 may be omitted) or simultaneously played (i.e. steps S814-S816 are simultaneously executed), which is not limited by the invention.

Namely, in the exemplary embodiment of FIG. 8, the source device 13 is a master device of the first multicast group, and is used for providing the first group mirror video, and the source device 14 is a master device of the second multicast group, and is used for providing the second group mirror video. The video stream processing apparatus 12 is not only a slave device of the first multicast group but is also a slave device of the second multicast group, and can respectively receive the first group mirror video and the second group mirror video.

Figure 9:
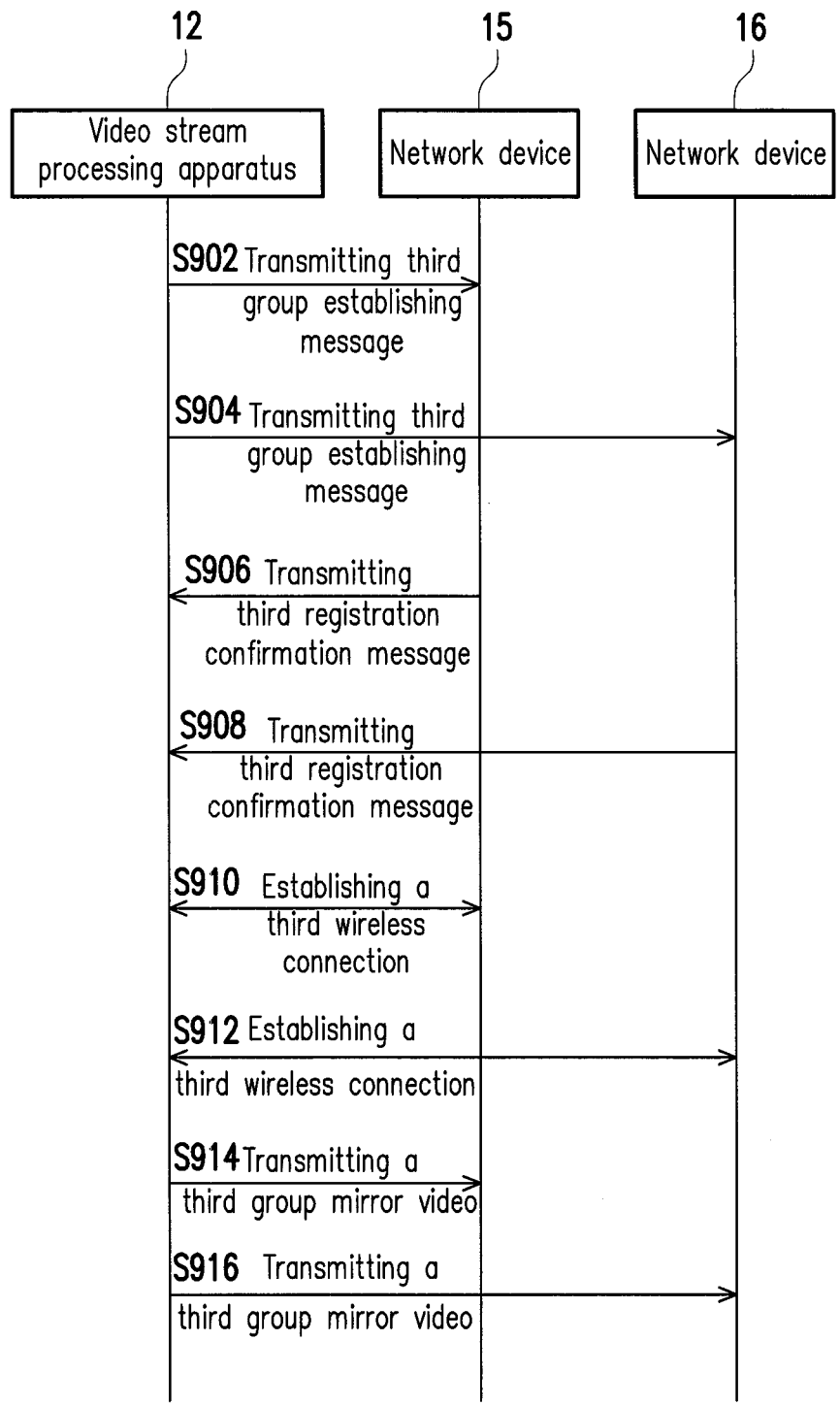
FIG. 9 is a communication timing diagram of a method for displaying mirror video according to an exemplary embodiment of the invention.

FIG. 9 is a communication timing diagram of the method for displaying mirror video according to an exemplary embodiment of the invention.

Referring to FIG. 9, after the network device 15 and the network device 16 are searched and found, in step S902, the processing unit 126 controls the communication unit 122 to transmit a third group establishing message to the network device 15, and in step S904, the processing unit 126 controls the communication unit 122 to transmit another third group establishing message to the network device 16. In response to the received third group establishing message, if the user of the network device 15 agrees to join the third multicast group where the video stream processing apparatus 12 belongs to, in step S906, the network device 15 transmits a third registration confirmation message to the video stream processing apparatus 12. Similarly, in response to the received third group establishing message, if the user of the network device 16 also agrees to join the third multicast group where the video stream processing apparatus 12 belongs to, in step S908, the network device 16 transmits another third registration confirmation message to the video stream processing apparatus 12. Step S902 and step S904 can be simultaneously or sequentially executed, and an execution sequence of step S906 and step S908 can be exchanged, which is not limited by the invention.

After receiving the third registration confirmation message from the network device 15, in step S910, the processing unit 126 controls the communication unit 122 to establish a third wireless connection between the video stream processing apparatus 12 and the network device 15. After receiving the third registration confirmation message from the network device 16, in step S912, the processing unit 126 controls the communication unit 122 to establish another third wireless connection between the video stream processing apparatus 12 and the network device 16. In step S914, the processing unit 126 controls the communication unit 122 to transmit the third group mirror video to the network device 15, and in step S916, the processing unit 126 controls the communication unit 122 to transmit the third group mirror video to the network device 16. Step S910 and step S912 can be synchronously executed or an execution sequence thereof can be exchanged. The step S914 can be executed at any time after step S910 is executed, and step S916 can be executed at any time after step S912 is executed, which is not limited by the invention.

Namely, in the exemplary embodiment of FIG. 9, the video stream processing apparatus 12 serves as a master device of the third multicast group for providing the third group mirror video, and the network device 15 and the network device 16 both serve as slave devices of the third multicast group.

In another exemplary embodiment, the video stream processing apparatus 12 may belong to the same third multicast group with the network device 15, and belong to another multicast group (which may be referred as a fourth multicast group) with the network device 16, so as to provide the third group mirror video to the network devices including the network device 15 which belong to the third multicast group and to provide a fourth group mirror video to the network devices including the network device 16 which belong to the fourth multicast group. The method for registering the network device 16 to the fourth multicast group and the method for transmitting the fourth group mirror video may refer to the exemplary embodiment of FIG. 9, and details thereof are not repeated.

Since each of the steps of FIG. 6 to FIG. 9 has been described above, and therefore details thereof are not repeated. It should be noticed that each of the steps of FIG. 6 to FIG. 9 can be implemented by a plurality of program codes or circuits, through the invention is not limited thereto. Moreover, the method of FIG. 6 to FIG. 9 can be used in collaboration with the aforementioned exemplary embodiments, or can be used separately, which is not limited by the invention.

In summary, the video stream processing apparatus, the method for displaying mirror video and the display device of the invention can establish wireless connections with two or more source devices, and receive mirror videos through the established wireless connections. Then, by controlling the screen to alternatively or simultaneously display the received mirror videos of different sources, an effect of selectively presenting the mirror videos of different sources is achieved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. A video stream processing apparatus, comprising:
a processor; and
a non-transitory storage medium, coupled to the processor, and configured to store a plurality of program modules, wherein the plurality of program modules are executed by the processor, and the plurality of program modules comprises:
a connection establishing module, configured to establish a first wireless connection with a first source device, and establish a second wireless connection with a second source device;
a mirror video receiving module, configured to receive a first mirror video from the first source device through the first wireless connection, and receive a second mirror video from the second source device through the second wireless connection; and
a mirror video display module, configured to control a screen to separately display the first mirror video or the second mirror video, or simultaneously display the first mirror video and the second mirror video.

2. The video stream processing apparatus as claimed in claim 1, wherein the first wireless connection and the second wireless connection coexist, and the first wireless connection and the second wireless connection are respectively complied with a wireless fidelity (WiFi) direct standard.

3. The video stream processing apparatus as claimed in claim 2, wherein the plurality of program modules further comprises:
a control message transmitting module, configured to transmit a pause message to the first source device for controlling the first source device to stop transmitting the first mirror video to the video stream processing apparatus, and transmit a play message to the second source device for controlling the second source device to start transmitting the second mirror video to the video stream processing apparatus.

4. The video stream processing apparatus as claimed in claim 3, wherein when the first mirror video is stopped transmitting to the video stream processing apparatus, the first wireless connection between the video stream processing apparatus and the first source device is continuously maintained.

5. The video stream processing apparatus as claimed in claim 3, wherein the pause message comprises a real time streaming protocol pause message, and the play message comprises a real time streaming protocol play message.

6. The video stream processing apparatus as claimed in claim 1, wherein the plurality of program modules further comprises:
an operation gesture recognition module, configured to receive an operation gesture, and determine whether the operation gesture relates to slide operation of a first direction or slide operation of a second direction, wherein the first direction is different to the second direction,
wherein the mirror video display module is further configured to switch the screen to display the first mirror video or the second mirror video according to whether the operation gesture is determined to be the slide operation of the first direction or the slide operation of the second direction.

7. The video stream processing apparatus as claimed in claim 1, wherein the first source device belongs to a first multicast group, the second source device belongs to a second multicast group, the first mirror video comprises a first group mirror video belonging to the first multicast group, and the second mirror video comprises a second group mirror video belonging to the second multicast group,
wherein the plurality of program modules further comprises:
a group establishing module, configured to receive a first group establishing message from the first source device, and transmit a first registration confirmation message in response to the first group establishing message, so as to register the video stream processing apparatus to the first multicast group,
wherein the group establishing module is further configured to receive a second group establishing message from the second source device, and transmit a second registration confirmation message in response to the second group establishing message, so as to register the video stream processing apparatus to the second multicast group,
the connection establishing module is further configured to establish the first wireless connection with the first source device after the video stream processing apparatus is registered to the first multicast group, and establish the second wireless connection with the second source device after the video stream processing apparatus is registered to the second multicast group.

8. The video stream processing apparatus as claimed in claim 7, wherein the plurality of program modules further comprises:
    a mirror video transmitting module; and
    a search module, configured to search for at least one network device in a network domain,
    wherein the group establishing module is further configured to transmit at least one third group establishing message after the at least one network device is found,
    wherein the group establishing module is further configured to receive at least one third registration confirmation message, and register at least one of the found network device to a third multicast group in response to the received third registration confirmation message,
    wherein after the group establishing module registers the at least one of the found network device to the third multicast group, the mirror video transmitting module is configured to transmit a third group mirror video belonging to the third multicast group to the registered network device through a third wireless connection.

9. A method for displaying mirror video, adapted to a video stream processing apparatus, comprising:
    establishing a first wireless connection with a first source device, and establishing a second wireless connection with a second source device;
    receiving a first mirror video from the first source device through the first wireless connection, and receiving a second mirror video from the second source device through the second wireless connection; and
    controlling a screen to separately display the first mirror video or the second mirror video, or simultaneously display the first mirror video and the second mirror video.

10. The method for displaying mirror video as claimed in claim 9, wherein the first wireless connection and the second wireless connection coexist, and the first wireless connection and the second wireless connection are respectively complied with a wireless fidelity (WiFi) direct standard.

11. The method for displaying mirror video as claimed in claim 10, wherein the step of receiving the first mirror video from the first source device through the first wireless connection and receiving the second mirror video from the second source device through the second wireless connection comprises:
    transmitting a pause message to the first source device for controlling the first source device to stop transmitting the first mirror video to the video stream processing apparatus; and
    transmitting a play message to the second source device for controlling the second source device to start transmitting the second mirror video to the video stream processing apparatus.

12. The method for displaying mirror video as claimed in claim 11, wherein after the first source device stops transmitting the first mirror video to the video stream processing apparatus, the method further comprises:
    continuously maintaining the first wireless connection between the video stream processing apparatus and the first source device.

13. The method for displaying mirror video as claimed in claim 11, wherein the pause message comprises a real time streaming protocol pause message, and the play message comprises a real time streaming protocol play message.

14. The method for displaying mirror video as claimed in claim 9, further comprising:
    receiving an operation gesture, and determining whether the operation gesture relates to slide operation of a first direction or slide operation of a second direction, wherein the first direction is different to the second direction; and
    switching the screen to display the first mirror video or the second mirror video according to whether the operation gesture is determined to be the slide operation of the first direction or the slide operation of the second direction.

15. The method for displaying mirror video as claimed in claim 9, wherein the first source device belongs to a first multicast group, the second source device belongs to a second multicast group, the first mirror video comprises a first group mirror video belonging to the first multicast group, and the second mirror video comprises a second group mirror video belonging to the second multicast group,
    and the method further comprises:
    receiving a first group establishing message from the first source device, and transmitting a first registration confirmation message in response to the first group establishing message, so as to register the video stream processing apparatus to the first multicast group; and
    receiving a second group establishing message from the second source device, and transmitting a second registration confirmation message in response to the second group establishing message, so as to register the video stream processing apparatus to the second multicast group,
    wherein the step of establishing the first wireless connection with the first source device and establishing the second wireless connection with the second source device comprises:
    establishing the first wireless connection with the first source device after the video stream processing apparatus is registered to the first multicast group; and
    establishing the second wireless connection with the second source device after the video stream processing apparatus is registered to the second multicast group.

16. The method for displaying mirror video as claimed in claim 15, further comprising:
    searching for at least one network device in a network domain;
    transmitting at least one third group establishing message after the at least one network device is found;
    receiving at least one third registration confirmation message, and registering at least one of the found network device to a third multicast group in response to the received third registration confirmation message; and
    after the at least one of the found network device being registered to the third multicast group, transmitting at least one third group mirror video belonging to the third multicast group to the registered network device through at least one third wireless connection.

17. A display device, comprising:
    a screen; and
    a video stream processing apparatus, electrically connected to the screen, and the video stream processing apparatus comprising:
        a connection establishing module, configured to establish a first wireless connection with a first source device, and establish a second wireless connection with a second source device, wherein the first wireless connection and the second wireless connection coexists, and the first wireless connection and the second wireless connection are respectively complied with a wireless fidelity (WiFi) direct standard;

a mirror video receiving module, configured to receive a first mirror video from the first source device through the first wireless connection, and receive a second mirror video from the second source device through the second wireless connection;

a mirror video display module, configured to control the screen to separately display the first mirror video or the second mirror video, or simultaneously display the first mirror video and the second mirror video; and an operation gesture recognition module, configured to receive an operation gesture, and determine whether the operation gesture relates to slide operation of a first direction or slide operation of a second direction, wherein the first direction is different to the second direction, wherein the mirror video display module is configured to switch the screen to display the first mirror video or the second mirror video according to whether the operation gesture is determined to be the slide operation of the first direction or the slide operation of the second direction.

18. The display device as claimed in claim 17, wherein the video stream processing apparatus further comprises:

a control message transmitting module, configured to transmit a real time streaming protocol pause message to the first source device for controlling the first source device to stop transmitting the first mirror video to the display device, and transmit a real time streaming protocol play message to the second source device for controlling the second source device to start transmitting the second mirror video to the display device, wherein after the first source device stops transmitting the first mirror video to the display device, the first wireless connection between the display device and the first source device is continuously maintained.

* * * * *